Feb. 25, 1958 R. A. GARRISON 2,824,447
POWER STEERING APPARATUS AND CONTROL VALVE THEREFOR
Original Filed Jan. 28, 1952 3 Sheets-Sheet 2

INVENTOR
ROBERT A. GARRISON
BY
Westall & Westall
ATTORNEYS

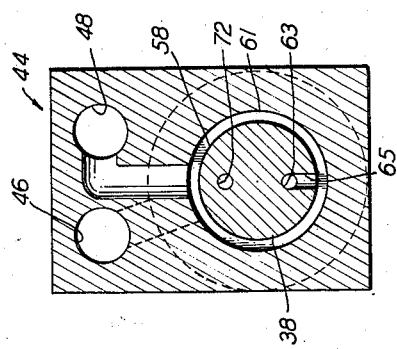

United States Patent Office 2,824,447
Patented Feb. 25, 1958

2,824,447

POWER STEERING APPARATUS AND CONTROL VALVE THEREFOR

Robert A. Garrison, San Marino, Calif.

Continuation of application Serial No. 268,587, January 28, 1952. This application May 24, 1954, Serial No. 431,649

3 Claims. (Cl. 180—79.2)

This invention relates to power steering boosters of the type embodying essentially a hydraulically powered unit for transmitting a motivating force to the steered parts and a valve mechanism for controlling the flow of pressure to the power unit, and more specifically contemplates improvements in the valve mechanism of such equipment. This application is a continuation of my copending application Serial No. 268,587, filed January 28, 1952, now abandoned.

Steering boosters of the type referred to comprise generally a power cylinder and a reciprocating double acting piston connected to the steering linkage to effect the desired steering adjustment incident to their relative extension or contraction in response to fluid pressure supplied from a suitable pump, the application of the pressure being controlled by a manually-actuated valve mechanism, arranged preferably in the drag link, idler bar or equivalent component of conventional steering control mechanism.

A principal feature of the apparatus resides in the provision of means to produce in the valve mechanism and to transmit to the manual steering control element a back pressure against, or resistance to any displacement of, the valve from neutral position, which back pressure or resistance is variable with and proportionate to the pressure of force required to induce actuation of the steered parts.

A principal object of the present invention is to provide a steering booster assembly of the type above referred to embodying telescopic valve mechanism interposed in the steering linkage and comprising a ported valve cylinder in the bore of which a manifold type valve piston is slidably reciprocable, the latter being formed with annular recesses and an eccentric longitudinal bore for communication, through ports in the valve cylinder, of the respective ends of the cylinder with the source of actuating fluid under pressure.

More specifically, an object is the provision in valve mechanism of the type referred to of centering rings interposed between the ends of the valve piston and ends of the valve cylinder, to normally seat upon shoulders formed in the cylinder but actuated in response to fluid pressure, upon displacement of the piston from neutral position, to return the valve elements to a relationship operable to maintain the adjusted position of the steered parts.

Another object is to provide means to obviate the development of a vacuum lock between the valve piston and the centering rings so as to assure uniform and unrestricted operation of the valve mechanism.

Still another object is to provide a telescopic valve unit having a centering mechanism controlled and actuated throughout its range of operation solely in response to hydraulic pressure, thus assuring, by the elimination of springs and the like, a direct and accurate transmission, to the driver, of a resistance to the manual steering impulse which corresponds with and is proportionate to the resistance of the roadbed to movement of the steered parts, as well as the tendency toward movement of the latter resulting from irregularities of the roadway.

Still another object is the provision of a pair of integral packing glands housed within the valve cylinder and encompassing the valve spool to form a hydraulic seal between the valve elements.

Still another object is to provide in a packing gland assembly a pair of lock rings engageable with the cylinder to confine the packing glands, the telescopic contraction and extension of the valve mechanism being limited by an annular shoulder formed in the valve cylinder and a nut threaded into the bore of the cylinder assembly, respectively.

The above and other objects such as economy of manufacture and assembly, and facility of installation, will be apparent from an examination of the following description read in the light of the accompanying drawings, in which:

Fig. 3 is a sectional view, taken on line 3—3 of Fig. 2; and

Fig. 4 is a longitudinal sectional view through the valve illustrating the valve piston shifted to the left to direct the flow of pressure fluid to one end of the power cylinder, and correspondingly to relieve pressure from the opposite end of the cylinder.

Figure 1:
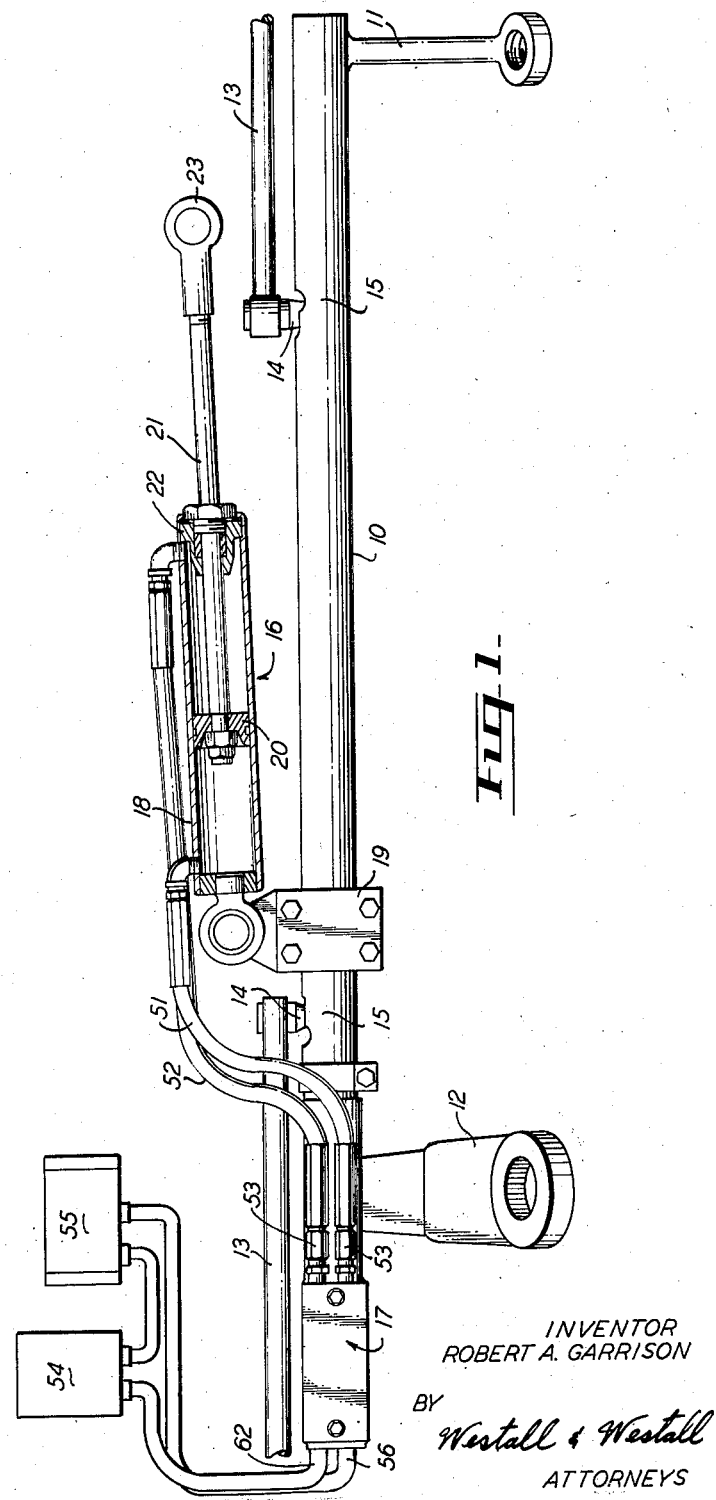
Fig. 1 is a plan view, partially broken away, of conventional motor vehicle steering linkage, illustrating in section and elevation, the steering booster assembly of my invention through which the steering operation is effected, in operative relationship therewith.
Figure 2:
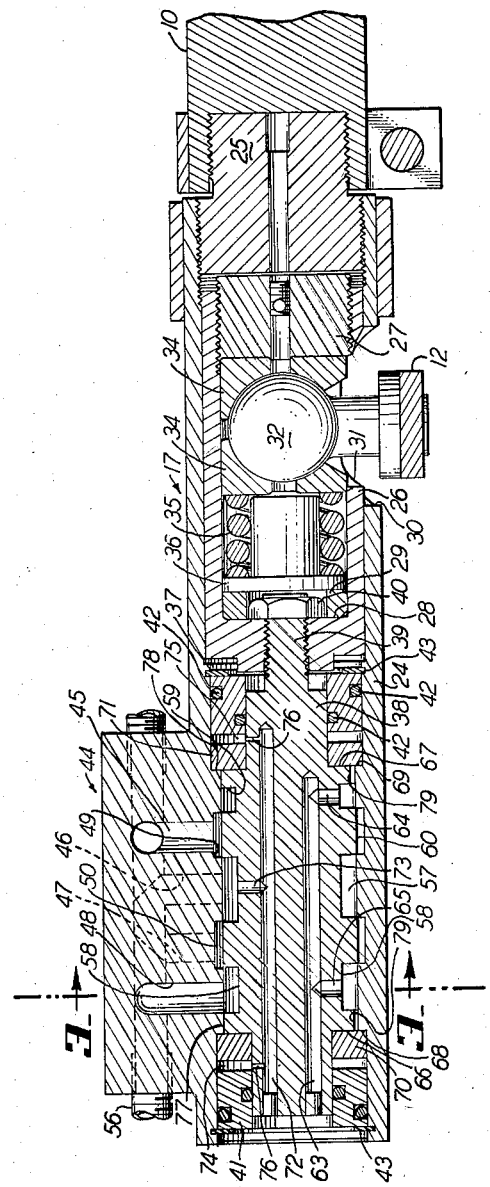
Fig. 2 is a longitudinal sectional view through the valve mechanism, illustrating the parts thereof in neutral positions.

Referring to the drawings in detail, the numerals of which indicate similar parts throughout the several views, 10 designates an idler bar which is pivotally supported in a position adjacent and parallel to the front axle of a vehicle (not shown) to which my invention is applied. Secured to one end of the idler bar 10 is an arm 11 which is pivotally attached to the chassis of the vehicle for the support of the end of the bar in a manner permitting the latter to swing about the axis of the arm pivot. The opposite end of the idler bar 10 is supported by a pitman arm 12 through which the bar is actuated, as will later be described. A pair of tie rods 13 connected to the steered parts (not shown) respectively, e. g., front steered wheels of a motor vehicle, are equipped with ball joints 14 which are housed in sockets 15 former in the ends of the idler bar 10, whereby the shifting of the bar in one direction or the other effects a corresponding steering adjustment of the steered parts.

It will be understood that in accordance with conventional construction, the idler bar 10 is actuated by a steering wheel or other manually operable member through suitable steering linkage which includes a pitman arm 12 (Fig. 1), hereinafter more in detail referred to. The present invention contemplates the application of power to the idler bar 10 in response to manipulation of the steering wheel of the vehicle. Essentially the unit comprises a hydraulically-operated power unit 16 and a valve mechanism 17 actuated incident to manipulation of the steering wheel (not shown) to control the flow of pressure fluid to the power unit. The power unit comprises a cylinder 18, one end of which is mounted by a clamp 19 or lug to the idler bar 10. A piston 20, reciprocably disposed within the cylinder 18, is connected to a piston rod 21 which projects through a suitable gland 22 in one end of the cylinder. The outer end of the piston rod 21 is equipped with a ball fitting 23 by which the rod is pivotally mounted to the chassis. It will be appreciated that the introduction of pressure into one end of the cylinder 18 and the corresponding relief of pressure from the opposite end of the cylinder causes the relative extension or contraction of the piston and cylinder and the corresponding movement of the idler bar 10 and steered parts.

As above indicated, the valvular mechanism 17 by which the operation of the power unit 16 is controlled, is connected to one end of the idler bar 10. The valve comprises a valve body or cylinder 24 into the bore of one end of which is threaded an adapter nut 25 which in turn is threaded into the bore of the idler bar. Slidable within the bore of the cylinder 24 is a tubular ball socket member 26 having a plug 27 threadedly fitted in one end thereof in a position adjacent and opposed to the adapter nut 25. The opposite end of the ball socket 26 is closed to form a shoulder 28 against which is seated an annular ball socket spacer 29. A lateral opening 30 in the cylinder 24 and a registering lateral opening 31 in the socket 26 permit the extension into the bores of these parts of a ball 32 of the pitman arm 12 which, as will be understood, is connected through suitable worm mechanism to the steering wheel or other manually operable member. The ball 32 of the pitman arm is confined between four ball socket seat segments 34, two of which bear against the plug 27. Interposed between the pair of segments at the opposite side of the ball 32 and the spacer 29 is a helical spring 35, the latter being supported by a spring seat 36 abutting against the spacer 29. Thus the ball 32 is held firmly rotatable but resiliently within the ball socket 26, and lateral movement of the pitman arm 12 and ball 32 is transmitted to the socket. The bore of the valve cylinder 24 is restricted slightly at 37 to form an annular shoulder which, with the adapter nut 25 limits the extent of the longitudinal movement of the socket 26 and plug 27 relative to the cylinder 24.

A valve piston 38 or spool forms a valve element slidable within the bore of the cylinder 24 and is formed with a reduced threaded axial stem 39 which is secured to the closed end of the socket 26 by a nut 40 so as to move therewith in response to actuation of the pitman arm 12. The ends of the valve piston 38 are reduced in diameter and are each encircled by a packing gland 41. A pair of packing rings 42, housed within each gland snugly engage the valve piston 38 and cylinder 24, respectively, so as to confine between the glands any fluid under pressure directed into the bore of the cylinder. 43 indicates each of a pair of lock rings engageable in the bore of the cylinder 24 to secure the glands 41 against displacement.

Integral with the top of the cylinder 24 is a valve head 44 formed with four flow passages 45, 46, 47, and 48 which are offset from one another both longitudinally of the cylinder and in a relative lateral direction. The first flow passage 45 in the head, i. e., the one nearest the ball socket assembly, and the third flow passage 47 in the head, open into the bore of the cylinder 24 in registry with annular grooves 49 and 50, respectively, formed in the bore of the cylinder. Hoses 51 and 52 connected by fittings 53 in the respective flow passages 45 and 47 lead to opposite ends of the power cylinder 18 to conduct hydraulic fluid under pressure from the valve mechanism to the cylinder and to relieve fluid pressure from cylinder 18, depending upon the operation of the valve, as will appear. Hydraulic fluid is supplied to the valve from a pump 55. The fluid is conducted from the pump 55 to the valve through a hose 56 which is attached by a fitting 53 in a flow passage 46 formed in the head 44. The flow passage 46 opens into the bore of the cylinder 24 in transverse registry with an annular groove 57 formed in the valve piston 38 or spool between the grooves 49 and 50 in the bore of the cylinder 24. The dimension of the groove 57, measured longitudinally of the valve piston is slightly greater than the distance between the grooves 49 and 50 whereby, with the valve piston 38 in a neutral position, fluid, under the pressure of the pump 55, is directed through the hose 56, flow passage 46 and into the groove 57, and thence into the grooves 49 and 50 in the bore of the cylinder, which are communicated with the opposite ends of the power cylinder 18, respectively, as hereinabove described. Adjacent to the ends of the valve piston 38 are a pair of annular grooves 58 and 59 which are spaced from the central inlet groove 57 by lands 60 and 61 (Fig. 4), the latter being of a dimension, measured longitudinally of the piston 38, equal to slightly less than the width of each of the grooves 49 and 50 in the bore of the cylinder 24. The flow passage 48 formed in the head intersects the bore of the cylinder 24 in registry with the groove 58 and is connected through a fitting 53 with a hose 62 leading to the reservoir 54 from which the pump 55 draws fluid for circulation through the system. The groove 59 in the valve piston 38 is connected to the groove 58 by an eccentric bore 63, formed in the piston 38, and short transverse intersecting bores 64 and 65, whereby hydraulic fluid entering the groove 59 flows freely through the bores 64, 63, and 65 to the groove 58, thence returning with the fluid entering the latter groove to the reservoir 54 from which the fluid is drawn by the pump 55. Accordingly with the valve piston in neutral position, it will be appreciated that a constant circulation of fluid is effected through the valve during operation. Fluid entering the valve through the hose 56, being directed from the central inlet groove 57 into both grooves 49 and 50 maintains an equal, constant pressure through the hoses 51 and 52 upon opposite sides of the piston 20 in the power cylinder 18. Thus with the valve in neutral position the power unit functions to resist displacement of the steered parts from preadjusted positions.

Any movement of the steering wheel or other manually operable steering device of the vehicle is transmitted through conventional mechanism to the pitman arm 12 and through the socket 26, idler bar 10 and other conventional steering linkage to the steered parts.

It will be appreciated that movement of the socket 26 in a direction longitudinally of the idler bar 10 is immediately transmitted to the valve piston 38 so as to shift the latter in one direction or the other from its neutral position. As illustrated in Fig. 4 moving the valve piston 38 to the left causes the land 60 to close off communication between the source of fluid pressure and groove 49 in the cylinder bore leading to one end of the power cylinder 18. Coincidentally the groove 57 is shifted more nearly into registry with the groove 50. Thus, the pressure of the fluid of the pump is confined to one end of the power cylinder 18 while the fluid within the cylinder at the opposite side of the piston 20 is permitted to flow from the power cylinder back to the valve through the hose 51 and grooves 49 and 59 in the valve piston, bore 63, groove 58 and thence return to the source through hose 62. Only a slight displacement of the valve piston 38 from neutral position results in the application of pressure against one side of the piston 20 and relieves pressure at the opposite side thereof so as to shift the piston and steered parts in the direction determined by the direction of movement of the steering wheel. It will be appreciated that as long as the valve piston 38 is displaced from neutral position, an excess of pressure will be applied to one side or the other of the power piston 20 within the cylinder 18 and the steered parts will continue to be correspondingly moved. The offset position of the valve piston will be maintained as long as movement of the manually-operated steering device is continued.

When the steered parts have been shifted to the required position and rotation or other actuating movement of the manual steering device is stopped, pressure upon the valve piston 38 through the pitman arm 12 will be relieved. It is essential that the valve promptly return to neutral position to correspondingly restore equal pressure to opposite sides of the power piston 20. The centering of the valve piston 38 is effected in the present invention by hydraulic pressure. For this purpose the ends of the piston 38 are reduced in diameter and the encircling portions of the cylinder are enlarged to form at each end of the piston outwardly-directed annular shoulders 66 and 67, which, with the piston in neutral position are complementary to and transversely aligned with annular shoulders 68 and 69 formed in the bore of the cylinder 24. Slidable upon the ends of the valve piston between each of the shoulders 66 and 67 and the glands 22 on the respective corresponding ends of the piston are a pair of slip rings 70 and 71, adapted normally to bear against the adjacent complementary pair of shoulders. The valve piston is formed with a second eccentric bore 72 extending longitudinally thereof which is in open communication with the groove 57 through a transverse port 73. The ends of the bore 72 are similarly connected with the annular chambers 74 and 75 between the slip rings and adjacent glands through ports 76. Thus fluid pressure of a value slightly less than the pressure at the inlet to the valve is continuously exerted against the slip rings. With the valve in neutral position this pressure upon the slip rings is transmitted equally to the shoulders 66, 67, 68 and 69 of the cylinder 24 and valve piston 38. Displacement of the valve piston from neutral position correspondingly displaces the slip ring 70 or 71 toward which the piston is moved and the pressure exerted through this ring is relieved from the cylinder and is confined to the piston, tending to return the piston to original position and opposing the pressure of the pitman arm 12. The other slip ring continues to bear against the adjacent shoulder formed in the bore of the cylinder and its pressure upon the piston is relieved. It will thus be seen that due to the pressure of the displaced ring against the end of the piston when the latter is shifted from neutral position, back pressure is exerted in opposition to the manual effort inducing such movement of the valve, so as to enable the driver to feel to a desired degree the resistance of the roadway to the steering operation.

In order to obviate any objectionable variation in the performance of the unit, i. e., to prevent any resistance to displacement of the valve piston during operation which might otherwise result in the event of the production of a vacuum between the slip rings 70 and 71 and valve piston shoulders 66 and 67 and the cylinder shoulders 68 and 69, the lands 77 and 78 on piston between the shoulders 66 and 67 and the end grooves 58 and 59, are each formed with slots 79 extending longitudinally of the piston so as to connect the last-identified grooves with the chambers behind the adjacent slip rings, thereby permitting the flow of hydraulic fluid into the zone behind either of the rings whenever the piston is displaced from neutral.

It will thus be seen that I have provided a hydraulic steering booster and more particularly a valve mechanism for such a unit embodying a manifold type valve piston which contributes to greater economy of manufacture, and incorporating mechanism actuated entirely in response to hydraulic pressure for producing a reaction or resistance to manual actuating movement proportionate to the pressure required to effect the desired steering adjustment of the vehicle.

It will be understood that the specific embodiment of my invention disclosed herein is only illustrative of numerous structures varying in size, design, shape, number and proportion of the various parts, and that changes in these particulars may be made without departing from the spirit of my invention as defined by the appended claims.

I claim as my invention:

1. In a power steering apparatus for a vehicle provided with a steering-wheel-operated pitman arm, provided with steered parts, and provided with two tie rods having spaced inner ends and having outer ends respectively connected to said steered parts, the combination of: an idler bar extending between and pivotally connected to said inner ends of said tie rods, said idler bar having at one end an extension extending outwardly beyond the point of pivotal connection of said idler bar to the inner end of one of said tie rods; a hydraulic pump; hydraulic motor means operable by fluid under pressure delivered by said pump for moving said idler bar longitudinally thereof in either direction to steer said steered parts through said tie rods, said hydraulic motor means including cylinder and piston members extending in the direction of said idler bar, one pivotally anchored relative to the frame of the vehicle, and the other moving said idler bar longitudinally thereof in one direction or the other depending on the fluid pressures existing in said cylinder member on opposite sides of said piston member; means of fluid communication between said hydraulic pump and said hydraulic motor means for admitting fluid into and discharging fluid from said cylinder member on said opposite sides of said piston member; valve means carried by said idler bar extension and located in said means of fluid communication for controlling the admission of fluid into and the discharge of fluid from said cylinder member to control the fluid pressures on said opposite sides of said piston member, whereby to control the operation of said hydraulic motor means; and means connecting said pitman arm to said valve means to operate said valve means in response to steering-wheel-induced movement of said pitman arm.

2. A power steering apparatus as defined in claim 1 in which said hydraulic motor means is located alongside of and is spaced from said idler bar, said other member being connected to said idler bar.

3. A power steering apparatus according to claim 1 wherein said valve means includes a valve body and a valve element movable relative to each other, said valve body being carried by said idler bar extension and said valve element being disposed in said valve body, said means connecting said pitman arm to said valev means being connected to said valve element.

References Cited in the file of this patent

UNITED STATES PATENTS

| 2,427,340 | Allison | Sept. 16, 1947 |
| 2,447,815 | Price | Aug. 24, 1948 |
| 2,608,263 | Garrison | Aug. 26, 1952 |

FOREIGN PATENTS

| 598,884 | Great Britain | Feb. 27, 1948 |